Patented Apr. 29, 1941

2,240,327

UNITED STATES PATENT OFFICE 2,240,327

GLASS COMPOSITION

Willem Elenbaas and Gottfried Bruno Jonas, Eindhoven, Netherlands

No Drawing. Original application July 28, 1936, Serial No. 93,114. Divided and this application April 16, 1938, Serial No. 202,570. In Germany August 6, 1935

1 Claim. (Cl. 106—36.1)

The present invention relates to glass compositions generally and more particularly the invention relates to such compositions useful as a container material for gaseous electric discharge devices containing a quantity of chemically active, difficultly vaporizable metal the vapor of which is light emitting during the operation of the device.

Ionized cadmium vapor is a chemically active material and attacks the glasses customarily used as container glasses for incandescent lamps and gaseous electric discharge lamps containing rare gases, such as lead or lime glasses. Cadmium vapor not only emits visible radiation when excited to luminescence by the passage of an electric discharge therethrough but also emits ultra-violet rays.

The object of the present invention is to provide a visible and ultra-violet ray transmitting glass which has a high softening temperature and which is resistant to chemical attack by hot, ionized cadmium vapor. Still further objects of the invention will be apparent to those skilled in the art from the following particular description.

We have discovered that a glass which is chemically stable in the presence of hot, ionized cadmium vapor, which has a high softening temperature and which transmits ultra-violet rays is one containing between

| | Per cent |
|---|---|
| Silica ($SiO_2$) | 55 to 78 |
| Alumina ($Al_2O_3$) | 12 to 23 |
| Calcium oxide (CaO) | 10 to 30 |

Particularly good glasses are those having the following compositions:

| | | I | II | III |
|---|---|---|---|---|
| | | Percent | Percent | Percent |
| Silica | ($SiO_2$) | 78 | 57 | 55 |
| Alumina | ($Al_2O_3$) | 12 | 23 | 15 |
| Calcium oxide | (CaO) | 10 | 20 | 30 |

These glass compositions are useful as container glasses for gaseous electric discharge lamp devices generally and particularly for such devices which operate at elevated container temperatures, such as cadmium vapor discharge lamp devices. These glasses are resistant to the hot, ionized cadmium vapor, have a high softening temperature and transmit the visible and ultra-violet rays emitted by excited cadmium vapor. Preferably the lamp container consisting of such glass in whole or in part is an elongated, tubular, sealed one having a thermionic, activated electrode mounted therein at each end thereof and having a quantity of cadmium and a starting gas therein, such as argon, neon or xenon, or a mixture of such gases, at a pressure of about 1 to 10 mm. The lamp device starts as a gas discharge lamp and operates as a vapor discharge lamp. The discharge in the lamp during the operation thereof when the light emitted thereby is rich in rays characteristic of the cadmium vapor is an arc discharge of the positive column type.

Preferably the lamp device is mounted in a light transmitting heat conservator, such as a sealed envelope or a Dewar flask to increase the efficiency thereof.

This application is a division of our co-pending application Serial Number 93,114, filed July 28, 1936, now U. S. Patent 2,116,742.

What we claim as new and desire to secure by Letters Patent of the United States is:

A glass containing:

| | Per cent |
|---|---|
| Silica ($SiO_2$) | 78 |
| Alumina ($Al_2O_3$) | 12 |
| Calcium oxide (CaO) | 10 |

WILLEM ELENBAAS.
GOTTFRIED BRUNO JONAS.

CERTIFICATE OF CORRECTION.

Patent No. 2,240,327.　　　　　　　　　　　　April 29, 1941.

WILLEM ELENBAAS, ET AL.

It is hereby certified that the above numbered patent was erroneously issued to the inventors, Willem Elenbaas and Gottfried Bruno Jonas, whereas said patent should have been issued to General Electric Company, a corporation of New York, as assignee of the entire interest therein, as shown by the record of assignments in this office; and that the said Letters Patent should be read with this correction therein that the same may conform to the record of the case in the Patent Office.

Signed and sealed this 22nd day of July, A. D. 1941.

(Seal)

Henry Van Arsdale,
Acting Commissioner of Patents.